July 22, 1969  C. L. SMITH ET AL  3,456,822
LOG GRAPPLE

Original Filed Dec. 28, 1966  2 Sheets-Sheet 1

INVENTORS
CHLOEY L. SMITH,
JACK M. BAIN,
BY
Berman, Davidson & Berman
ATTORNEYS.

July 22, 1969   C. L. SMITH ET AL   3,456,822
LOG GRAPPLE
Original Filed Dec. 28, 1966   2 Sheets-Sheet 2
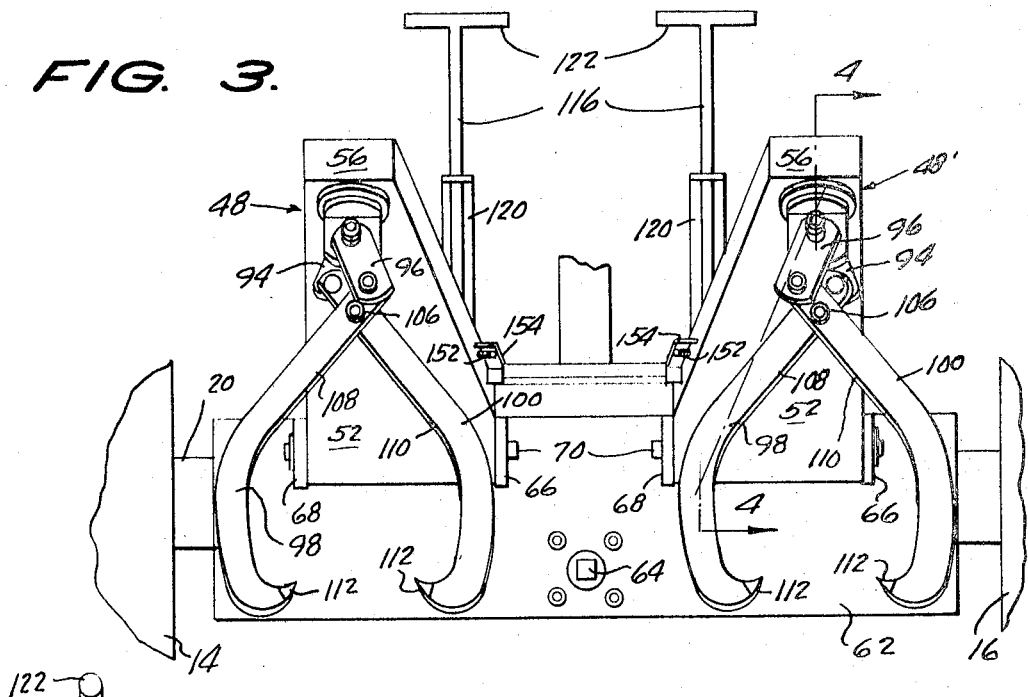
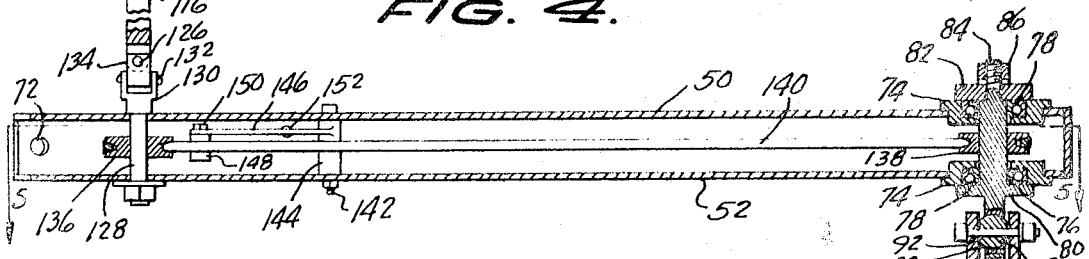
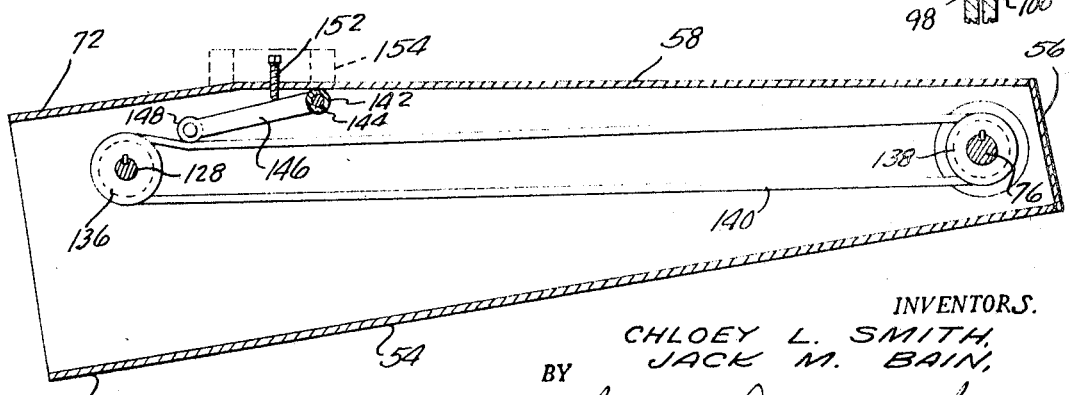
INVENTORS.
CHLOEY L. SMITH,
JACK M. BAIN,
BY
Berman, Davidson & Berman
ATTORNEYS.

United States Patent Office 3,456,822
Patented July 22, 1969

3,456,822
LOG GRAPPLE
Chloey L. Smith, Rte. 1, Box 188, Valliant, Okla. 74764, and Jack M. Bain, P.O. Box 279, Idabel, Okla. 74745
Continuation of application Ser. No. 605,491, Dec. 28, 1966. This application Jan. 2, 1969, Ser. No. 789,660
Int. Cl. B66c 3/00
U.S. Cl. 214—147                                    10 Claims

ABSTRACT OF THE DISCLOSURE

A log grapple attachment for a vehicle including a hollow boom pivoted for swinging movement in a vertical plane by operation of the vehicle lift mechanism. A pair of tongs is supported by linkage on the free end of the boom to swivel through 360° about a vertical axis in such manner as to permit closing and opening of the tongs to grasp and release a log by merely moving the boom. The tongs are swingable to desired angles by an endless belt trained over pulleys within the boom and driven by a hand crank connected through a universal joint and slidable in a slotted bracket to retain the crank near the operator during swinging of the boom. A roller and lever are provided within the boom, the position of the lever being adjustable from outside the boom to engage the roller against the belt for tightening thereof.

---

This application is a continuation of Ser. No. 605,491 filed Dec. 28, 1966, now abandoned.

FIELD OF INVENTION

This invention relates to an improved log grapple and more particularly to an attachment to be placed on a tractor for towing, pulling, raising or dragging logs.

The primary object of the invention is to provide a grapple attachment, for a tractor, or other vehicle, capable of being automatically hooked to, or unhooked from a log lying in any position on the ground relative to the vehicle.

An important object of the invention is to provide an improved log grapple having a pair of tongs which are rotatable 360° and so arranged so that they may be coupled with or uncoupled from a log by merely moving the boom upon which the tongs are swiveled.

Another object of the invention is to provide an improved log grapple wherein the log to be lifted may lie at any angle with respect to the tractor to which the grapple is attached, the coupling and uncoupling of the tongs being controlled by merely moving the boom in a vertical plane, thus avoiding the conventional need for aligning the tractor with the log to couple the log to the tractor.

It is a further object of the invention to provide automatically operable tongs which require no controls for coupling or release other than those provided in the normal tool lifting mechanism found on conventional tractors, thus, eliminating any and all requirements for additional valves, switches, air compressor, hoses, electric wiring or hydraulic supply lines.

Yet a further object of the invention is to provide a device of the described character which is simple in construction and which may be readily mounted on a tractor without disturbing the present parts or functions of said tractor.

A still further object of the invention is to provide a device having the characteristics described above, that is strong and durable in construction, efficient and reliable in operation, relatively inexpensive to manufacture, and otherwise well adapted for the purpose for which the same is intended.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout the several figures and in which:

FIGURE 3 is a rear elevation of the mounted pair of grapples shown in FIGURE 1;

FIGURE 4 is a sectional view taken on line 4—4 of FIGURE 3, looking in the direction of the arrows; and FIGURE 5 is a cross-sectional view at right angles to FIGURE 4, taken along the line 5—5 of FIGURE 4, looking in the direction of the arrows.

Figure 1:
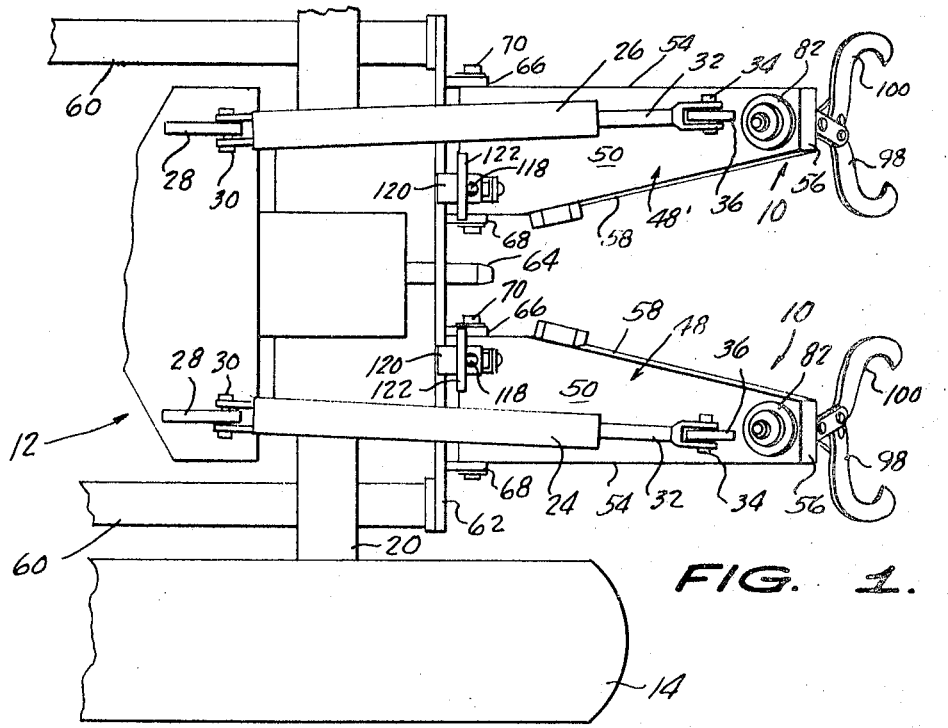
FIGURE 1 is a plan view of a pair of log grapples according to the invention attached to the rear of a conventional tractor, only a portion of the tractor being shown.

Referring now more particularly to the drawings, a pair of improved log grapples, generally indicated at 10, are for illustrative purposes shown attached to the rear of a conventional tractor 12. While the tractor may have any desired construction and, indeed, the attachment is not limited to tractors, but may be used with other vehicles, the tractor illustrated for the purpose of showing the mode of attaching the improved device, is shown as having a pair of rear wheels 14, 16 mounted on axle 18 surrounded by housing 20. A seat 22 for the operator is positioned nearly over the rear axle. Conventionally, the tractor is supplied with one or more tool lift mechanisms, in this case comprising a pair of hydraulic cylinders 24, 26 each pivoted to an upstanding support 28 as at 30 and having a rearwardly extending piston rod 32 for pivotal attachment to the log grapple, as by bolt 34, extending through an aperture in the upstanding lug 36 fixed to the grapple 10. The hydraulic cylinders are double-acting, having pressure fluid inlet and outlet conduits 38, 40 controlled by valve mechanisms 42, only one being shown, having control handles 44, 46 whereby the pistons within the cylinders may be moved to any desired position and held therein. The handles are within easy reach of an operator seated at 22 on the tractor.

Each grapple 10 comprises a boom, 48 or 48', formed as a hollow, box-like structure having upper and lower parallel walls 50, 52, a straight sidewall 54, end wall 56 and an angular sidewall 58, which diverges from wall 54 from rear to front so that the box-like structure formed is open at its forward end and is larger at the front than the rear where the pair of tongs is supported. The boom 48' of the second grapple is a mirror image of the described first boom 48, and since all of the remaining parts of the second grapple are identical with those of the first, they will be described only once and referenced by identical numerals.

The support frame for the grapples may be any conventional tool support provided on the tractor, here illustrated as including a pair of lateral beams 60 and a rear plate 62 apertured for the power take-off 64. Two pairs of spaced apertured ears 66, 68 are welded or otherwise affixed to the frame wall 62. The forward end of each boom is pivoted to and between a pair of ears by a bolt 70 extending through the apertures of the ears and through apertures 72 in the sidewalls of the boom so as to provide a horizontal axis. Vertical movements of the booms are thereby engendered by movements of the piston rods 32 pivoted to the lugs 36 affixed to the top walls 50 of the booms near their rear ends.

Referring more particularly to FIGURE 4, the outer ends of the upper and lower walls 50, 52 of each boom are provided with openings in which annular, dish-shaped bearing sockets 74 are fixed. A vertical spindle 76 is rotatably mounted in said sockets by frictionless ball bearing races 78 secured therein by an integral bottom flange 80 on the spindle and a holding member 82 at the top engaging the upper face of the upper bearing socket. Member 82 is secured by means of a threaded reduced extension 84 of the spindle 76 and a lock washer and nut 86. The lower end of the spindle extending below the flange 80 is apertured to receive an annular bearing 88 in which is mounted a sphere 90 flattened at the ends of a diameter. The sphere 90 is provided with an axial bore through which horizontally passes a bolt 92 pivotally mounting the upper ends of the two links 94, 96, one on either side of the flat faces of the ball 90. The lower ends of the links are also apertured and each link is pivotally connected to the upper end of a pair of crossed tongs 98, 100 by bolts 102, 104 having countersunk heads and locking nuts. The tongs 98, 100 are crossed at a point below their upper ends and where they are apertured to receive a pivot bolt 106. The pair of tongs are shaped to diverge downwardly from one another to form cam surfaces 108, 110 and terminate in more-or-less parallel lower portions with inturned barbs 112, or hook ends.

Figure 2:
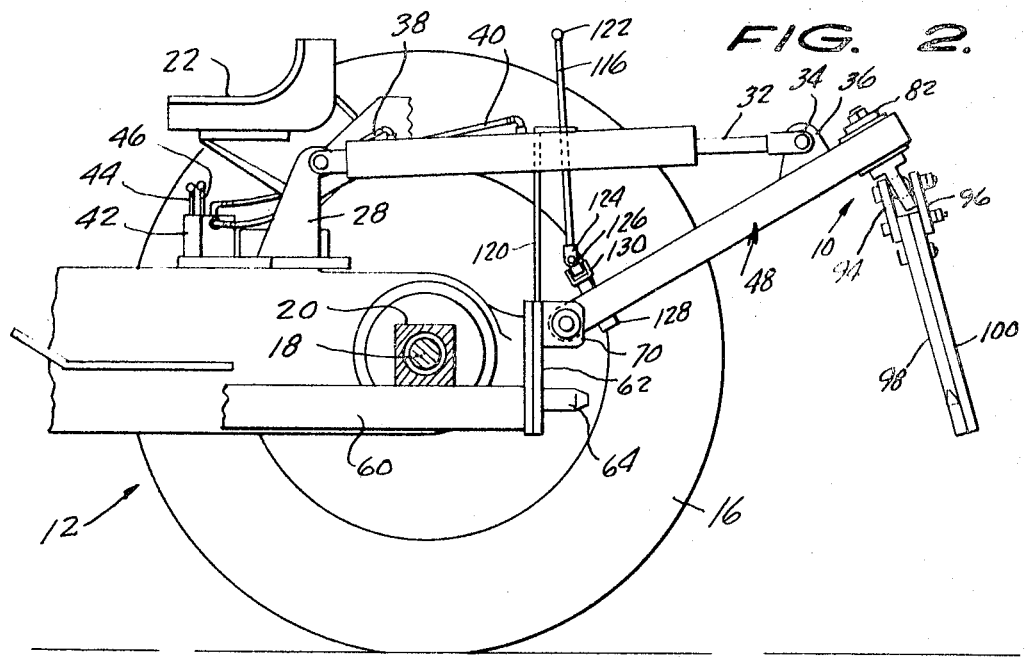
FIGURE 2 is a side elevation of the portion of the tractor shown in FIGURE 1, with the near wheel removed to reveal details of the improved log grapple.

In the above described construction, the swivel member 76 is unlimitedly rotatable in either direction through 360°, and the ball 90 permits swinging movements of the pair of tongs in their own plane and about the pivot 92 limited only by striking of the tongs against the edges of the supporting boom, i.e., swinging through an arc of substantially more than 180°. While the ball 90 would normally permit the pair of tongs to swing freely in a direction perpendicular to the plane of the tongs, or the direction in which the hooks 112 of the tongs open, such movement is restricted to relatively small angles in opposite directions by striking of the lowermost portion 114 of the spindle against one or the other of the links 94, 96, this being shown in FIGURE 2 wherein the pair of tongs has tilted forwardly to a maximum permitted by said engagement.

The angular position of each swivel 76 is controlled by the tractor operator by rotation of a T-shaped crank member 116 which is slidably received in a slot 118 on an inverted L-shaped bracket 120 suitably attached to the rear wall 62 of the frame 60. The upper handle 122 of the crank 116 is within reach of the tractor operator who need not leave his seat. The bottom of each crank 116 is provided with an integral fork 124, or clevis, with apertures receiving a pivot stub shaft 126. Traversing the hollow interior of the boom from top to bottom is a pivot bolt 128 whose head comprises a second fork 130 turned at right angle to the first clevis and apertured to receive a pivot stub shaft 132 perpendicular to shaft 126. A coupling 134 receives the stub shafts 126, 132 through perpendicular bores, thus providing a universal connection between the bottom of the crank 116 and the head 130 of the pivot bolt 128.

Within each hollow boom, a pair of pulleys 136, 138 are mounted on the pivot bolt 128 and the spindle 76, each being keyed to their mounting members, as shown in FIGURE 5. Thus, the pulleys turn with the pivot bolt and the spindle, and movements of the crank 116 are transferred to the spindle 76 by an endless belt 140, of wedge-shaped cross-section, trained over the two pulleys. In this manner the tractor operator may turn either spindle and its associated pair of tongs 98, 100 so that their plane will occupy any desired angular position with respect to the supporting boom.

A belt tightener mechanism is also mounted within each hollow boom. This mechanism comprises a bolt 142 traversing the interior of the boom and passing through receiving openings in the upper and lower walls thereof. A rotatable collar 144 having a lever arm 146 integrally formed thereon is pivoted on bolt 142. The outer end of the lever rotatably mounts a roller 148 by means of bolt 150, the roller being engaged against the outer face of the belt 140. An adjusting screw is threaded in the threaded opening in the sidewall portion of the boom so that its end engages the lever arm at a point spaced from the fulcrum, bolt 142. Any desired degree of pressure may be exerted to tighten the belt by turning the screw 152 threaded in an aperture in wall 58 and accessible from the outside of the boom, the inner end of the screw bearing against the lever 146. To protect the adjusting screw 152, a three-sided shield 154 is welded or otherwise affixed to the sidewall 58 of the boom, the screw being accessible through the open end of the inverted U-shaped shield.

The improved grapple may be operated in the following manner. The tractor operator reverses his tractor to approach an end of a log which he is desirous of transporting to another location. This backing of the tractor does not have to be in line with the log, but may be directed toward the log at almost any inclination. When the tractor has been stopped with a pair of tongs 98, 100 over the log, the operator rotates the associated crank handle 122 until the plane of the tongs is perpendicular to the center line of the log. He then operates the hydraulic valve 42 to extend the piston in the hydraulic cylinder and lower the boom 48, causing the hooks of the tongs to engage the log and thereby spread the tongs apart until the surfaces 108, 110 of the tongs are seated on top of the log with the barbs 112 extending more-or-less horizontally and spaced from the sides of the log at, or approximately below, the center of the log. The hydraulic valve 42 is then operated to lift the boom 48. This upward movement permits the tongs to close toward each other by their own weight as soon as the upper surface of the log leaves the underside of the tong portions 108, 110, and the barbs 112 enter the log to firmly clamp the same and lift the log with the boom. When the end of the log has been lifted at least a few inches above the ground the tractor may be driven and maneuvered toward another log, which may be hooked and lifted in the same manner as the first, by means of the second pair of tongs on the second boom 48'.

The tractor may then be driven to the location where the logs are desired to be unloaded, the hooked ends of the logs hanging from the tongs and the other ends skidding along the ground. When the unloading position is reached, the hydraulic valves 42 are operated to lower the booms past the level where the lifted ends of the logs engage the ground, at which level the upper surfaces of the logs will engage the portions 108, 110 of the tongs and spread them apart to disengage the barbs from the logs. With the booms down and the tongs thus forced wide open, the tractor may be driven forward, or away from the logs until the tongs are clear thereof. Such movement will not close the tong barbs in the logs because of the limited travel of the ball 90 on tilting movements of the tongs, as previously described. The tongs will stay open until they are entirely clear of the logs. Thus, the tractor is ready for movement to another pair of logs to be transported, the operation described above being then repeated.

It is evident that the described operation is readily performed by an operator without need to leave his seat, the pairs of tongs opening and closing automatically by moving the booms with conventional lift mechanisms provided on the tractor. It will also be understood that air, or other pressure fluid, devices may be substituted for the described hydraulic cylinders and that any known form of endless flexible members such as a chain trained over sprockets may be used in place of the belt and pulleys.

Although a certain specific embodiment of the invention has been shown and described, it is obvious that many modifications thereof are possible. The invention, therefore, is not to be restricted except insofar as is necessitated by the prior art.

What is claimed is:

1. A log grapple for removable support upon a vehicle having a tool lift mechanism, comprising a hollow elongated boom of box-like construction having a horizontal pivot at one end and a vertical swivel at the other end, means mounting said swivel for 360° rotation in either direction including a first pulley within the boom fixed to the swivel, a second pulley mounted within the boom near said first end, and a flexible endless member engaged about said pulleys so that rotation of the second pulley will rotate the swivel, a pair of tongs having lower terminal barbs, said tongs crossing and being pivotally connected at the crossing point spaced from their upper ends, link means pivotally connecting the upper ends of said tongs to said swivel, means for connecting the boom to a lift mechanism carried by a vehicle for raising and lowering said boom in a substantially vertical plane about said pivot, and means for manually rotating said swivel including a control member located on the boom and connected to said second pulley.

2. A log grapple according to claim 1 wherein said flexible endless member is a belt trained over said pulleys, and a belt tightener is provided comprising a pivot shaft crossing the interior of the hollow boom, a lever pivoted at one end about said pivot shaft, a roller engaging the belt and rotatably mounted on the other end of said lever, and an adjusting member engaging said lever at a point spaced from the pivot shaft and extending out of the hollow boom for fixing the angular position of the lever to achieve an adjustment of the tightness of said belt.

3. A log grapple according to claim 1 wherein said second pulley is fixed to a shaft which extends out of said boom where it is connected by a universal joint to an elongated rod secured to a crank handle, a slotted bracket for attachment to a vehicle in a position which will slidably receive said rod to position the crank handle close to the vehicle operator, said crank handle imparting desired rotation to the swivel supporting said pair of tongs, and said universal joint permitting sliding movement of the rod in the slot of said bracekt regardless of the position and movements of the boom.

4. A log grapple according to claim 1 wherein said swivel protrudes downwardly out of the hollow boom and is provided with a spherical bearing segment mounting a ball, said pair of links being pivoted to the swivel by a pivot shaft extending axially of the ball through an opening therein in a direction perpendicular to the plane of said tongs.

5. A log grapple according to claim 4 wherein said pair of links are positioned closely adjacent to the sides of said protruding portion of the swivel and the ball mounted therein so that the bottom edge of the protruding portion of the swivel will engage the links and limit motion of the tongs in a direction perpendicular to their plane, said ball permitting swinging movement of the tongs in their plane through an angle greater than 180°.

6. A log grapple according to claim 1 wherein said means mounting said swivel for 360° rotation comprises a pair of annular, dish-shaped bearing sockets mounted in apertures in the upper and lower walls of said hollow boom, and annular ball bearing races seated in said sockets.

7. A log grapple according to claim 5 in combination with a tractor having a lift mechanism, said mechanism being pivotally attached to said boom near its said other end, and said one end of the boom being attached to the rear of the tractor in such manner as to enable turning movement in a vertical plane about said horizontal pivot.

8. A log grapple for removeble support upon a vehicle having a tool lift mechanism, comprising an elongated boom having a horizontal pivot at one end and a vertical swivel at the other end, means mounting said swivel for 360° rotation in either direction including a first pulley fixed to the swivel, a second pulley mounted on the boom near said first end, and a flexible endless member engaged about said pulleys so that rotation of the second pulley will rotate the swivel, a pair of tongs having lower terminal barbs, said tongs crossing and being pivotally connected at the crossing points spaced from their upper ends, link means pivotally connecting the upper ends of said tongs to said swivel, means for connecting the boom to a lift mechanism carried by a vehicle for raising and lowering said boom in a substantially vertical plane about said pivot, and means for manually rotating said swivel including a control member located on the boom near said first end, said means for manually rotating said swivel including a shaft fixed to said second pulley, an elongated rod carrying a crank handle at one end and secured to said shaft at the other end by a universal joint, and slotted means for attachment to a vehicle in a position which will slidably receive said rod to locate the crank handle close to the vehicle operator, said crank handle imparting desired rotation to the swivel and connected pair of tongs, and said universal joint permitting sliding movement of the rod in said slotted means regardless of the position and movements of the boom.

9. A log grapple for removable support upon a vehicle having a tool lift mechanism, comprising an elongated boom having a horizontal pivot at one end and a vertical swivel at the other end, means mounting said swivel for 360° rotation in either direction including a first pulley fixed to the swivel, a second pulley mounted on the boom near said first end, and a flexible endless member engaged about said pulleys so that rotation of the second pulley will rotate the swivel, a pair of tongs having lower terminal barbs, said tongs crossing and being pivotally connected at the crossing point spaced from their upper ends, link means pivotally connecting the upper ends of said tongs to said swivel, means for connecting the boom to a lift mechanism carried by a vehicle for raising and lowering said boom in a substantially vertical plane about said pivot, and means for manually rotating said swivel including a control member located on the boom and connected to said second pulley.

10. A log grapple forremovable support upon a vehicle having a tool lift mechanism, comprising an elongated boom having a horizontal pivot at one end and a vertical swivel at the other end, means mounting said swivel for 360° rotation in either direction including a first pulley fixed to the swivel, a second pulley mounted on the boom near said first end, and a flexible endless member engaged about said pulleys so that rotation of the second pulley will rotate the swivel, a pair of tongs having lower terminal barbs, said tongs crossing and being pivotally connected at the crossing point spaced from their upper ends, link means pivotally connecting the upper ends of said tongs to said swivel, means for connecting the boom to a lift mechanism carried by a vehicle for raising and lowering said boom in a substantially vertical plane about said pivot, and means for manually rotating said swivel including a control member located on the boom near said first end, said means for manually rotating said swivel including a shaft fixed to said second pulley, and an elongated rod carrying a crank handle at one end and secured to said shaft at the other end.

References Cited
UNITED STATES PATENTS

| | | | |
|---|---|---|---|
| 2,685,974 | 8/1954 | Kern | 214—147 |
| 2,778,514 | 1/1957 | McLean | 214—147 |

GERALD M. FORLENZA, Primary Examiner

G. F. ABRAHAM, Assistant Examiner